F. W. LOWE.
WIRE HINGE.
APPLICATION FILED JAN. 2, 1909.

944,681.

Patented Dec. 28, 1909.

Witnesses.
H. B. Davis,
E. A. Jordan.

Inventor:
Frank W. Lowe
by Noyes & Norman
Atty's

UNITED STATES PATENT OFFICE.

FRANK W. LOWE, OF BOSTON, MASSACHUSETTS.

WIRE HINGE.

944,681.

Specification of Letters Patent.　　Patented Dec. 28, 1909.

Application filed January 2, 1909.　Serial No. 470,362.

*To all whom it may concern:*

Be it known that I, FRANK W. LOWE, of Boston, county of Suffolk, State of Massachusetts, have invented an Improvement in Wire Hinges, of which the following is a specification.

Figure 1:
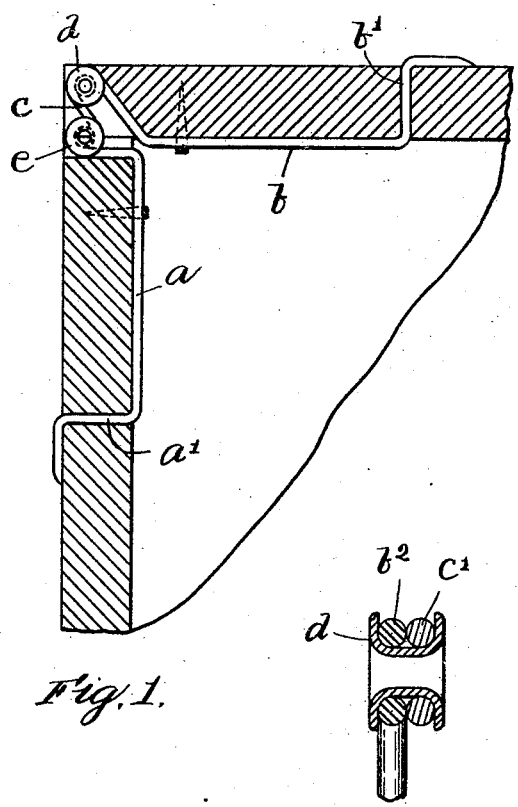
Figure 2:
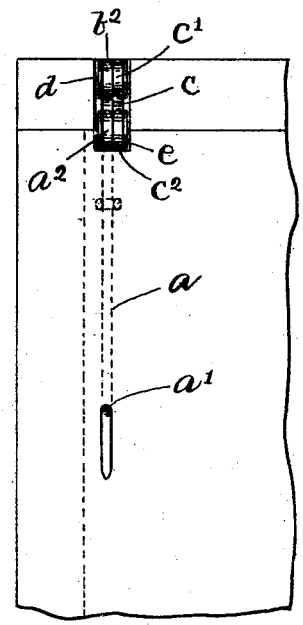
Figure 3:
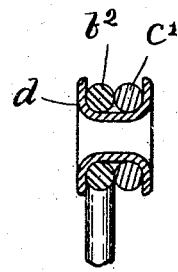
Figure 4:
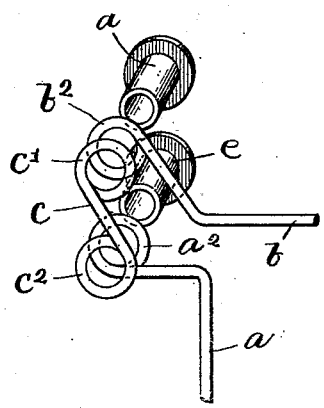

This invention particularly relates to a form of hinge which is especially adapted for use on covers for wooden boxes and has for its object to provide a form of hinge which may be made of wire at small expense and which will nevertheless be as durable and operate in as satisfactory a manner as the ordinary hinge. I accomplish this object by the means shown in the accompanying drawing, in which, Figure 1 is a sectional view of a box provided with a wire hinge made according to my invention. Fig. 2 is an end view thereof. Fig. 3 is a detail sectional view of one of the joints. Fig. 4 is a detail perspective view of the joint previous to assembling.

According to my invention I provide two wire attaching members $a$ and $b$, and an intermediate link member $c$. The members $a$ and $b$ are respectively provided with right angular end portions $a'$ and $b'$, which are adapted to be driven through the sides and cover of the box, and preferably clenched, as shown, and to secure the member firmly thereto. As shown in the drawing, the intermediate portions of the members are adapted to lie against the inner side of the box, while the end portions of the member $a$, opposite its attached end $a'$, is bent at right angles to lie against the edge of the box and the corresponding end portion of the member $b$ is bent obliquely so that it extends, in a saw kerf, across the cover over the adjacent end of the member $b$. The adjacent ends of the members $a$ and $b$ are respectively bent to provide eyes $a^2$ and $b^2$, said eyes being circular in form, as shown and so arranged that the eye and bent end portion of each member lie in the same plane. A link $c$ is bent to provide circular eyes $c'$ and $c^2$, at each end thereof, of the same diameter as the eyes of said members $a$ and $b$. The link $c$ is adapted to extend from eye $a^2$ to eye $b^2$ and the eyes $c'$, $b^2$ and the eyes $a^2$, $c^2$ are arranged in pairs side by side respectively, and eyelets $d$ and $e$ are respectively passed through said pairs of eyes, as indicated in Fig. 4, before the flanges at both ends are formed thereon. The tubular portion of each eyelet is adapted to fit closely in said eyes, and, when the flanges on both ends are formed, each pair of eyes are held closely together thereon, the flanges, however, not being pressed together with sufficient force to prevent said eyes being turned freely with relation to each other. A hinge is thus provided at small expense, which may be readily attached to an ordinary box, and which fulfils all requirements of a box hinge.

Having described my invention, what I claim as new and desire to secure by Letters Patent is:—

A box hinge comprising two wire sections each bent at one end to form a circular eye, said eyes being disposed side by side in register, and a hollow pivot passing through said eyes and having flanges at its ends disposed to hold said eyes in engagement, substantially as described.

In testimony whereof, I have signed my name to this specification in the presence of two subscribing witnesses.

FRANK W. LOWE.

Witnesses:
H. B. DAVIS,
L. H. HARRIMAN.